United States Patent Office 2,836,577
Patented May 27, 1958

2,836,577

STABILIZED POLYMERIC COMPOSITIONS

Alfred J. Kolka, Birmingham, and George G. Ecke, Detroit, Mich., assignors to Ethyl Corporation, New York, N. Y., a corporation of Delaware No Drawing. Application September 23, 1955
Serial No. 536,313

4 Claims. (Cl. 260—45.95)

This invention relates primarily to polymer stabilization. More particularly, this invention relates to the protection of hydrocarbon polymers against oxidative deterioration.

High molecular weight hydrocarbon polymers such as natural rubber, polystyrene, polybutadiene, polyisobutylene, polyethylene, butyl rubber, isobutylene-styrene copolymers, GR–S rubbers and the like are susceptible of oxidative deterioration particularly when subjected to elevated temperatures and the action of light. When the polymers contain olefinic-type linkages one point of attack is the double bonds. However, in such unsaturated polymers and in polymers which do not contain olefinic-type linkages there is another different and serious type of deterioration. This results from free radical formation within the polymers, which formation is promoted by oxygen or ozone and catalyzed by heat, light and/or impurities such as metals and metal compounds. The free radicals which are formed readily undergo chemical reaction with the polymer itself. Undesirable chemical and physical transformations are the result. Thus, hydrocarbon polymers deteriorate prematurely, lose tensile strength and other desirable properties such as pliability, flexibility or the like depending upon the polymer in question, and become discolored and embrittled.

The art appreciates that the problem of suppressing oxidation of solid high molecular weight hydrocarbon polymers is quite different from the problems confronted in the art of stabilizing liquid petroleum hydrocarbon products such as gasoline, lubricating oils and turbine oils. In these products, the focal point of oxidation is almost entirely the unsaturated hydrocarbons contained therein. As a general rule antioxidants which satisfactorily inhibit oxidation of liquid petroleum products are incapable of satisfactorily inhibiting oxidative deterioration of hydrocarbon polymers of the type in question.

An object of this invention is to provide means for protecting solid hydrocarbon polymers which deteriorate in or are affected adversely by oxygen. Another object is to provide solid hydrocarbon polymers protected against deterioration in the presence of oxygen or ozone. A further object is to provide means for increasing the resistance of solid hydrocarbon polymers against oxidative deterioration during manufacturing, handling and storage. A further object is to provide means for reducing the antioxidant requirement of inherently unstable solid hydrocarbon polymers. Another object is to provide means for preventing embrittlement, discoloration, loss of tensile strength and other harmful effects in solid hydrocarbon polymers during the milling, compounding, fabrication, storage, handling and use of such hydrocarbon polymers. Other important objects of this invention will become apparent from the ensuing description.

According to this invention the above and other objects are accomplished by providing a solid hydrocarbon polymer having a molecular weight of at least about 10,000 and being normally susceptible of oxidative deterioration containing, in amount sufficient to inhibit such deterioration, a small antioxidant quantity of a 2,6-dialkyl phenol in which there is a total of 5 to 12 carbon atoms in the alkyl groups and in which at least one of these alkyl groups is branched on the alpha carbon atom.

Preferred inhibitors of this invention are 2,6-dialkyl phenols containing a total of 6 to 10 carbon atoms in the alkyl groups, both of the alkyl groups being branched on their respective alpha carbon atoms. Such inhibitors are particularly effective in stabilizing such hydrocarbon polymers, even when used in small concentrations. These inhibitors exhibit their maximum effectiveness in solid hydrocarbon polymers normally susceptible of oxidative deterioration which have molecular weights ranging from about 25,000 to about 400,000.

As used in the description and claims herein, the term "hydrocarbon polymer" means a polymer which is essentially hydrocarbon in nature but includes polymers which contain relatively small amounts of nitrogen or sulfur. Essentially hydrocarbon polymers containing relatively small amounts of nitrogen or sulfur in the molecule possess characteristics essentially analogous to true hydrocarbon polymers. GR–N which is a mixed polymer of butadiene and acrylonitrile serves as an example of a hydrocarbon polymer containing a small amount of nitrogen. Sulfur-vulcanized natural rubber is an example of a hydrocarbon polymer containing a small amount of sulfur.

A particularly preferred embodiment of this invention is polyethylene containing a small antioxidant quantity of 2,6-di-tert-butylphenol. While any 2,6-dialkyl phenol having a total of from 5 to 12 carbon atoms in the alkyl groups, at least one of which groups is branched on the alpha carbon atom, and more particularly a 2,6-dialkyl phenol having a total of from 6 to 10 carbon atoms in the alkyl groups both of which are so branched, will increase the resistance of polyethylene to deterioration in the presence of oxygen, 2,6-di-tert-butylphenol is particularly effective. For this reason, the other phenolic inhibitors of this invention are less preferable than 2,6-di-tert-butylphenol for use in polyethylene. In the case of natural rubber, 2,6-di-tert-butylphenol gives outstanding results, although 2-methyl-6-tert-butylphenol is also very effective. On the other hand, 2-methyl-6-tert-amyl phenol is very effective when used in piperylene rubber. It can be seen, therefore, that the optimum inhibitor for use in hydrocarbon polymers according to this invention is dependent to some extent upon the particular polymer to be stabilized.

The hydrocarbon polymers which are stabilized against oxidative deterioration according to this invention include natural rubber, GR–S and GR–N rubbers, butyl rubber, methyl rubber, polybutene rubber, butadiene rubbers, piperylene rubbers, dimethylbutadiene rubbers, polystyrene, polybutadiene, polyisobutylene, polyethylene, isobutylene-styrene copolymer and, in general, hydrocarbon polymers which are normally susceptible to oxidative deterioration. Such polymers are well known in the art and besides being susceptible of oxidative deterioration are characterized by having molecular weights above about 10,000. As pointed out above, the problem resulting from heat, light and catalyst promoted oxidative deterioration in such hydrocarbon polymers is intensified because of free radical formation within the polymers. This leads to various forms of physical and chemical degradation such as chain scission, autocatalytic oxidation, reduction in molecular weight and loss of original physical properties. The net result is that the desirable, useful and necessary properties of the polymers which are associated with their original chemical structure and molecule weights are lost to a greater or lesser extent unless the polymers are stabilized against such deterioration.

Methods of determining the average molecular weights of hydrocarbon polymers as herein defined are well known to those skilled in the art and are reported in the literature. Certain of these methods make use of osmotic pressure and viscosity measurements.

As will be further brought out in the ensuing description, the unique effectiveness of our inhibitors in protecting oxygen-sensitive hydrocarbon polymers is tied in with the particular structure of the phenols we use for this purpose. This high degree of effectiveness results from the combination of having both positions alpha to the hydroxyl group occupied with alkyl groups, at least one of which is branched on its alpha carbon and having the para position unsubstituted. This discovery is unexpected in view of the work of prior investigators leading to the conclusion that substitution in the para position was necessary in order to achieve effective stabilization.

Typical stabilized hydrocarbon polymers of this invention are illustrated by the following specific examples wherein all parts and percentages are by weight.

EXAMPLE I

To a synthetic rubber master batch comprising 100 parts of GR-S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of 2-methyl-6-tert-butylphenol. This batch is then cured for 60 minutes at 45 pounds per square inch of steam pressure.

EXAMPLE II

To the master batch described in Example I is added 0.5 percent of 2,6-di-tert-butylphenol.

EXAMPLE III

One percent of 2-isopropyl-6-tert-butylphenol is added to a synthetic rubber master batch comprising 100 parts of GR-S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example I.

EXAMPLE IV

Two parts of 2,6-diisopropylphenol is incorporated in 100 parts of raw butyl rubber prepared by the copolymerization of 90 percent of isobutylene and 10 percent of isoprene and having an average molecular weight of 100,000.

EXAMPLE V

To 200 parts of raw butyl rubber having an average molecular weight of 600,000 and prepared by copolymerizing 95 percent of isobutylene and 5 percent of butadiene is added 1.5 parts of 2-ethyl-6-tert-butylphenol.

EXAMPLE VI

To a master batch of GR-N synthetic rubber comprising 100 parts of GR-N rubber having an average molecular weight of 75,000, 5 parts of zinc stearate, 50 parts of carbon black, 5 parts of road tar, 2 parts of sulfur and 2 parts of mercaptobenzothiazole is added 5 percent based on the weight of the batch of 2,6-di-tert-butylphenol.

EXAMPLE VII

To the master batch described in the next preceding example is added 0.2 percent of 2,6-di-(3-hexyl)phenol.

EXAMPLE VIII

To 1000 parts of polyethylene produced by oxygen-catalyzed reaction under a pressure of 20,000 atmospheres and having an average molecular weight of 40,000 is added and mixed 2 parts of 2,6-di-tert-butylphenol.

EXAMPLE IX

One part of 2-methyl-6-tert-butylphenol is incorporated in 100 parts of polyethylene having an average molecular weight of 30,000.

EXAMPLE X

A dry blend of polystyrene and 2-methyl-6-tert-amyl phenol is prepared by mixing 1 part of this phenol with 100 parts of polystyrene having an average molecular weight of 50,000.

EXAMPLE XI 1000 parts of polystyrene having an average molecular weight of 200,000 is melted. To the molten polystyrene is added 5 parts of 2,6-di-tert-butylphenol and after mixing the temperature is reduced to room temperature.

EXAMPLE XII 0.25 percent by weight of 2-methyl-6-tert-butylphenol is incorporated in polybutadiene having an average molecular weight of 50,000.

EXAMPLE XIII

To 100 parts of polyisobutylene having an average molecular weight of 100,000 is added 0.5 part of 2-isopropyl-6-tert-butylphenol.

EXAMPLE XIV

To natural rubber (Hevea) is added 0.02 percent of 2,6-di-tert-amyl phenol.

The above examples illustrate the improved compositions of this invention. Other such compositions and the methods of preparing the same will now be apparent to one skilled in the art.

To illustrate the enhanced oxygen resistance of the hydrocarbon polymer compositions of this invention, a natural rubber compounded into a typical tire-tread formula was selected for test. One requisite of such stocks is that the desirable properties incorporated therein by careful selection of the compounding ingredients and cure time shall be maintained during extended periods of storage or use in the presence of oxygen. Comparison of various rubber stocks is best carried out on stocks initially having the same state of cure. The most reliable means for determining the state of cure is by the T-50 test, ASTM designation: D-599-40T, described in the ASTM Standards for 1952, Part 6. This test measures the temperature at which a test piece recovers its elasticity when it is stretched at room temperature, frozen at a sufficiently low temperature to cause it to lose its elastic properties, and then gradually warmed. In practice the temperature noted is that at which the sample recovers to 50 percent of the original elongation and is, therefore, referred to as the T-50 value. In the examples that follow, stocks for testing and comparison were cured for a time sufficient to have a T-50 value of −4.5° C. so that a valid comparison of the properties could be made. The accelerated aging was conducted by the procedure of ASTM designation: D-572-52, described in the ASTM Standards for 1952, Part 6, for a period of 96 hours at a temperature of 70° C., with an initial oxygen pressure in the test bomb of 300 pounds per square inch gauge on specimens having the following composition:

| | Parts by weight |
|---|---|
| Smoked sheets | 100.00 |
| Carbon black | 45.00 |
| Zinc oxide | 5.00 |
| Stearic acid | 3.00 |
| Pine tar oil | 2.00 |
| Sulfur | 3.00 |
| Mercaptobenzothiazole | 0.65 |
| | 158.65 |

To demonstrate the protection afforded to the rubber by the inhibitors of our invention, the tensile strength and the ultimate elongation of stocks prepared by the addition of an inhibitor of our invention were determined before and after aging. These properties were compared with the same properties determined on an identical rubber stock not protected by an inhibitor. Both of these properties were determined by means of the test procedure of ASTM designation: D-412-51T, fully described in ASTM Standards for 1952, Part 6. The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance. The results of Tests 1 and 3 shown in the following table were achieved by the use of the named inhibitors in the above rubber formulation at a concentration of 1 part of inhibitor per 158.65 parts by weight of rubber formulation.

Table
EFFECT OF AGING PROPERTIES OF RUBBER

| Test No. | Stabilizer | Percent of Original Retained After Aging | |
|---|---|---|---|
| | | Tensile strength | Ultimate Elongation |
| 1 | 2-Methyl-6-tert-butylphenol | 17.8 | 58.1 |
| 2 | None | 12.1 | 50.0 |
| 3 | 2,6-Di-tert-butylphenol | 21.7 | 52.0 |
| 4 | None | 14.2 | 44.0 |

By referring to the table it is apparent that both numbers 1 and 3 are effective in promoting retention of the tensile strength and ultimate elongation over the control samples which contained no protective additive (numbers 2 and 4).

The inhibitors of this invention find particular utility in the stabilization of light colored hydrocarbon polymers where non-staining characteristics of the inhibitor are essential. To illustrate the non-staining characteristics of the above-described phenolic inhibitors in the protection of light colored stocks the following base formula was used.

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.10 |
| Sulphur | 3.00 |
| Mercaptobenzothiazole | 1.00 |
| | 181.10 |

To the above base formula was added 1 part by weight of 2,6-di-tert-butylphenol and the sample was cured for 45 minutes at 274° F. using perfectly clean molds with no mold lubricant. After curing, a sample of the above protected light colored stock was exposed for 24 hours using a discoloration weatherometer so as to determine the amount of discoloration which occurred during this period of time. It was found that the presence of 2,6-di-tert-butylphenol in this light colored stock caused essentially no discoloration.

Another cured sample of the above light colored stock containing 2,6-di-tert-butylphenol was subjected to a test procedure designed to determine the amount of migration staining. In this test, a piece of the above cured sample was placed between two steel panels which had been painted with enamel and allowed to dry. This sample was then exposed for 48 hours at 212° F. in a hot air oven using a 5 pound weight on the panels to maintain rubber-to-metal contact. On completion of this test it was found that essentially no migration staining had occurred.

To further illustrate the outstanding potency of the inhibitors of this invention in retarding oxidative deterioration of hydrocarbon polymers comparative tests were conducted using polyethylene. In these tests measurements were made of the amount of oxygen absorbed by a polyethylene film at 160° C. In these tests commercially available polyethylene which was free of inhibitor was used. Master batches of this polyethylene were prepared using differential mill rolls to effect thorough mixing of antioxidant ingredients. The antioxidants employed were 2,6-di-tert-butylphenol, a stabilizer of this invention and 2,6-di-tert-butyl-4-methylphenol, a widely used phenolic antioxidant. Master batches of these antioxidants in polyethylene were made containing 1 percent by weight of the additive. Portions of these were then diluted in polyethylene on differential mill rolls to obtain a concentration of 0.05 percent by weight of 2,6-di-tert-butylphenol and 0.10 percent by weight of 2,6-di-tert-butyl-4-methylphenol. Milled sheets were also made of the same polyethylene without stabilizer to serve as a control.

Pressings 0.015 inch to 0.025 inch thick were made of each of the above named samples and these were individually laid out on pieces of aluminum foil. The weights were recorded and the samples were all put into a circulating air oven set at 160° C. Periodically, the samples were removed and weighed and the amount of oxygen absorbed by the polyethylene was determined by the increase in the weight of the samples. In all instances the surface areas of each sample were essentially equal because the degree of oxygen absorbed is dependent upon the amount of exposed surface area. It was found that after one hour of residence time in the oven the unprotected polyethylene had increased in weight by 0.04 gram. In this same period the polyethylene containing 0.10 percent by weight of 2,6-di-tert-butyl-4-methylphenol had increased in weight to the extent of 0.01 gram. Thus, a prior art material did afford some protection but at the same time permitted a measurable and pronounced amount of oxygen to be absorbed. In contra-distinction the polyethylene which contained only 0.05 percent by weight of 2,6-di-tert-butylphenol did not gain in weight showing that the sample had not absorbed a measurable amount of oxygen in this period of time. Thus, it can be seen that 2,6-di-tert-butylphenol is considerably more effective than 2,6-di-tert-butyl-4-methylphenol in inhibiting oxygen absorption of polyethylene even when used at ½ the concentration. Indeed, in this test a typical example of the materials of this invention completely inhibited oxygen up take. Moreover, it was noted that the polyethylene samples not of this invention exhibited a definite color change much earlier than the polyethylene stabilized according to this invention. This color change—a decided darkening to a strong yellow color—is indicative of the amount of oxidative deterioration which occurred during the tests.

It can be seen from the results described above that the inhibitors of this invention are unusually effective in preventing oxidative deterioration of hydrocarbon polymers having molecular weights of at least about 10,000. In addition to this great effectiveness the inhibitors of this invention possess additional important advantages. For example, the inhibitors of this invention are highly compatible with the hydrocarbon polymers in question and thus can be employed therein in higher concentration than inhibitors suggested heretofore. This enables the achievement of greatly increased resistance to oxidative deterioration. This high compatibility is due to the combination of the particular chemical structure of the inhibitors of this invention and the relatively low molecular weights they possess as compared with many polynuclear phenolic inhibitors suggested heretofore. The inhibitors of this invention also have the decided advantage of possessing non-staining characteristics. This markedly enhances their utility in various hydrocarbon polymers which are used in applications where discoloration is offensive and intolerable.

The foregoing results are illustrative of the benefits achieved by the practice of this invention. Good results are achieved using other inhibitors of this invention including such compounds as 2-methyl-6-tert-butylphenol, 2-ethyl-6-tert-butylphenol, 2-n-propyl-6-(2-hexyl)phenol, 2-n-propyl-(1,1-dimethylheptyl)phenol, 2-n-butyl-6-tert-butylphenol, and the like. Even better results are achieved with such compounds as 2-isopropyl-6-tert-butylphenol, 2-isopropyl-6-tert-amyl phenol, 2,6-diisopropyl phenol, 2,6-di-(2-amyl)phenol, 2,6-di-sec-butyl-phenol, 2,6-di-tert-butylphenol, 2,6-di-tert-amyl phenol, and the like. These and other inhibitors of this invention can be prepared according to the process described in our co-pending application, Serial Number 426,556, filed April 29, 1954.

The amount of inhibitors of this invention employed in hydrocarbon polymers varies from about 0.01 to about 5 percent by weight of the polymer stabilized depending upon the nature of the polymer and the conditions of service to be encountered. Thus, in the stabilization of natural and synthetic rubber to be used in the manufacture of tires which are normally subjected to exposure to the elements as well as to the action of sunlight, frictional heat, stress and the like, the use of relatively high concentrations of our inhibitors is advantageous. On the other hand, when the article of manufacture is not to be subjected to such severe conditions, such as in the case of molded goods fabricated from polyethylene, relatively low concentrations of our inhibitors can be successfully utilized.

We claim:

1. A solid hydrocarbon polymer having a molecular weight of at least about 10,000 and being normally susceptible of oxidative deterioration containing, in amount sufficient to inhibit such deterioration, a small antioxidant quantity of a 2,6-dialkyl phenol in which the position para to the hydroxyl group is unsubstituted, there is a total of from 5 to 12 carbon atoms in the alkyl groups, and at least one of said alkyl groups is branched on the alpha carbon atom.

2. The composition of claim 1 in which the molecular weight of the polymer is from 25,000 to 400,000, the 2,6-dialkyl phenol contains a total of from 6 to 10 carbon atoms in the alkyl groups, and both of the alkyl groups are branched on the respective alpha carbon atoms.

3. Polyethylene containing a small antioxidant quantity of 2,6-di-tert-butylphenol.

4. The composition of claim 1 in which the polymer is a rubber and the branched alkyl group is a tertiary alkyl group having from 4 to 5 carbon atoms.

References Cited in the file of this patent

UNITED STATES PATENTS

| 2,459,597 | Stillson et al. | Jan. 18, 1949 |
| 2,730,436 | Young et al. | Jan. 10, 1956 |

OTHER REFERENCES

Rosenwald et al.: "Alkyl Phenols as Antioxidants," Ind. and Engineering Chem., vol. 42, January 1950, pp. 162–165.